US012740579B2

(12) United States Patent
Kaiser et al.

(10) Patent No.: US 12,740,579 B2
(45) Date of Patent: Sep. 22, 2026

(54) LIQUID OIL-BASED FAT SYSTEM COMPOSITION FOR MICROWAVE POPCORN

(71) Applicant: Conagra Foods RDM, LLC, Chicago, IL (US)

(72) Inventors: Steven Kaiser, Omaha, NE (US); Indarpal Singh, Omaha, NE (US); Andrew Wassinger, Omaha, NE (US)

(73) Assignee: Conagra Foods RDM, LLC, Chicago, IL (US)

( * ) Notice: Subject to any disclaimer, the term of this patent is extended or adjusted under 35 U.S.C. 154(b) by 152 days.

(21) Appl. No.: 17/308,214

(22) Filed: May 5, 2021

(65) Prior Publication Data

US 2021/0345650 A1 Nov. 11, 2021

Related U.S. Application Data

(60) Provisional application No. 63/020,100, filed on May 5, 2020.

(51) Int. Cl.

| | |
|---|---|
| ***A23L 7/183*** | (2016.01) |
| ***A23B 20/30*** | (2025.01) |
| ***A23D 9/013*** | (2006.01) |
| ***A23D 9/04*** | (2006.01) |
| ***A23L 27/40*** | (2016.01) |
| ***B65B 25/22*** | (2006.01) |
| ***B65D 81/34*** | (2006.01) |

(52) U.S. Cl.

CPC .............. *A23L 7/183* (2016.08); *A23B 20/30* (2025.01); *A23D 9/013* (2013.01); *A23D 9/04* (2013.01); *A23L 27/40* (2016.08); *B65B 25/22* (2013.01); *B65D 81/3469* (2013.01); *A23V 2002/00* (2013.01)

(58) Field of Classification Search

CPC .......... A23L 7/183; A23L 7/161; A23L 27/40; A23D 9/013; A23D 9/04; A23D 9/06; B65B 25/22; B65D 81/3469; A23V 2002/00

USPC .......................................................... 426/107

See application file for complete search history.

(56) References Cited

U.S. PATENT DOCUMENTS

| | | | |
|---|---|---|---|
| 6,083,552 | A | 7/2000 | Kershman et al. |
| 2006/0078655 | A1 | 4/2006 | Plank et al. |

(Continued)

FOREIGN PATENT DOCUMENTS

| | | |
|---|---|---|
| KR | 20130114584 A | 10/2013 |

OTHER PUBLICATIONS

Rachel, "Make It Yourself Popcorn Bags—DIY Microwave Popcorn with Light Sea Salt", Apr. 2015, retrieved from the Internet: https://cleanfoodcrush.com/diy-popcorn-bags/ (Year: 2015).*

(Continued)

*Primary Examiner* — Emily M Le
*Assistant Examiner* — Tynesha L Mcclain
(74) *Attorney, Agent, or Firm* — Ryan T. Grace; Advent, LLP

(57) ABSTRACT

A liquid-oil based fat system for use in microwave popcorn products is described to prevent wicking and leaking of oil from microwave popcorn packaging. In an aspect, a microwave popcorn product includes a charge of popcorn and a slurry including a liquid-based oil, a structuring ingredient, and a seasoning for introduction to a microwave popcorn package that expands during the popping process in a microwave.

11 Claims, 2 Drawing Sheets

(56) References Cited

U.S. PATENT DOCUMENTS

| | | | |
|---|---|---|---|
| 2008/0003344 | A1 | 1/2008 | Jensen et al. |
| 2011/0281015 | A1 | 11/2011 | Higgins et al. |
| 2015/0305362 | A1 | 10/2015 | Rakitsky et al. |

OTHER PUBLICATIONS

Notification of Transmittal of the Internationalsearch Report and the Written Opinion of the International Searching Authority, or the Declaration dated Aug. 23, 2021 for App. No. PCT/US21/30791.

* cited by examiner

LIQUID OIL-BASED FAT SYSTEM COMPOSITION FOR MICROWAVE POPCORN

CROSS-REFERENCE TO RELATED APPLICATIONS

The present application claims the benefit under 35 U.S.C. § 119(e) of U.S. Provisional Application Ser. No. 63/020,100, entitled LIQUID OIL-BASED FAT SYSTEM COMPOSITION FOR MICROWAVE POPCORN, filed May 5, 2020. U.S. Provisional Application Ser. No. 63/020,100 is hereby incorporated by reference in its entirety.

BACKGROUND

Microwave food products can incorporate packaging utilizing flexible panels sealed together to form an interior volume to hold one or more components to be heated in a microwave. As an example, microwave popcorn bags typically involve one or more plies of a flexible paper sealed to form a pouch. A charge of unpopped popcorn is introduced to the pouch along with an oil and desired seasonings. The pouch can include expandable gussets to increase the inner volume of the package as steam is emitted during the popping process of the popcorn. Additionally, the package may include a susceptor element, which can take the form of a metallized film, to focus heat to the charge of popcorn in the microwave.

SUMMARY

This summary is provided solely as an introduction to subject matter that is fully described in the detailed description and drawings. The summary should not be considered to describe essential features nor be used to determine the scope of the claims. Moreover, it is to be understood that both the summary and the detailed description are examples and explanatory only and are not necessarily restrictive of the subject matter claimed.

Aspects of the disclosure pertain to alternative oil blends for use in microwave popcorn products as part of a fat system to prevent wicking and leaking of oil from microwave popcorn packaging. In an aspect, a microwave popcorn product includes a charge of popcorn and a slurry including a liquid oil, a structuring ingredient, a seasoning, and an antioxidant for introduction to a microwave popcorn package that expands during the popping process in a microwave. The liquid oil and the structuring ingredient provide characteristics that prevent significant wicking of oil during product storage, that provide desirable consumer mouthfeel, that provide suspension of salt during commercial production, and that facilitate processing efficiency during commercial production.

DETAILED DESCRIPTION

Overview

Figure 1:
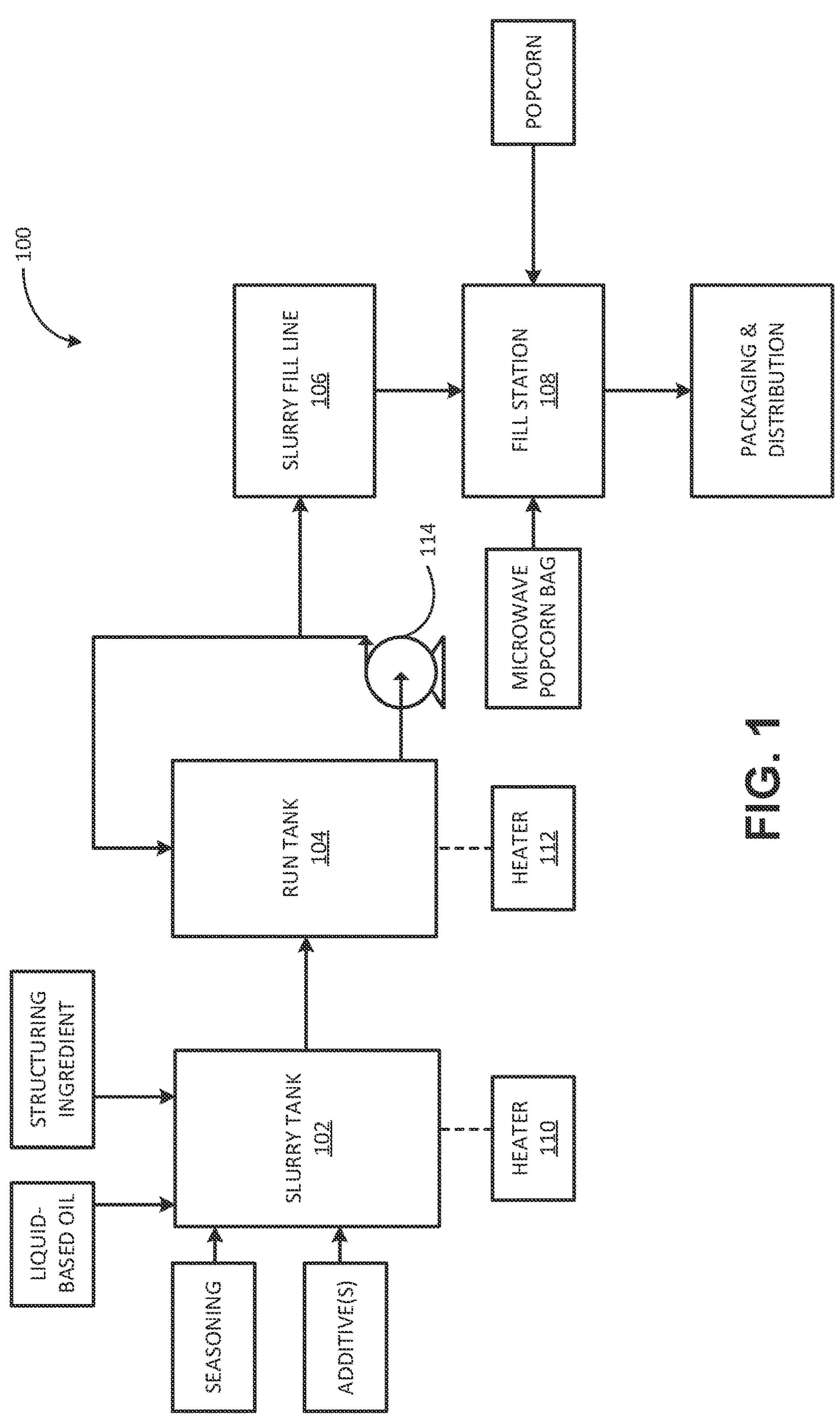
FIG. 1 is a production process for a microwave popcorn product having a structuring ingredient and fat content to maintain liquid fats in an organogel during storage of the microwave popcorn product in accordance with example implementations of the present disclosure.

Microwave popcorn packages typically include a liquid oil introduced with the charge of popcorn and other seasonings. The liquid oil facilitates the heating and popping process and can aid in coating the popcorn kernels with the seasoning, among other functionality. The microwave packaging can include a paper bag having gussets or expansion panels that expand during the process, however liquid oils can seep from the packaging, which can be referred to as wicking. To prevent oil seepage or wicking, many microwave popcorn packages include a grease-resistant packaging, grease-resistant insert, or other packaging-based technique(s) to contain the oil, provide a barrier to oil passage, or the like. However, oils that are low in saturated fats still pose seepage or wicking concerns for many microwave popcorn packages during transport and storage of the microwave popcorn packages, including those with grease-resistant features.

Palm oil is an oil included in many microwave popcorn products and can provide structure to the liquid portions of the popcorn charge to prevent oil wicking through the package during periods of storage prior to introduction to the microwave. However, palm oil can be perceived with health and sustainability stigma. Additionally, palm oil can have drawbacks from a commercial production standpoint, particularly through the inability of palm oil to maintain salt in suspension. If a commercial production line is stagnant for a period of time (e.g., during a process plant power outage), the salt suspended by liquid palm oil tends to settle at the bottom of the process pipes. This can pose a significant burden in production efficiency as the production facility spends time and effort in cleaning the pipes after production downtime, such as between batches, following a power outage, following servicing of one or more components of the production line, or the like. For example, when the salt settles from the liquid palm oil, the production facility may remove pipes to clean settled slurry out of the pipe interior, introduce pressurized fluid cleaners, manually clean production vessels, etc. These cleaning procedures can stall additional production, provide health hazards to cleaning crews, and otherwise cause the production process to become inefficient.

Alternative oils can be beneficial to consumers, but such oils are typically lower in saturated fats than palm oil and present a multitude of challenges for introduction to microwave popcorn products. For example, many oils that are lower in saturated fats than palm oil introduce issues of wicking and leaking of liquid oil from the microwave popcorn package during storage. Such wicking can be off-putting to consumers (e.g., by leaving an oily residue during contact with consumers and surfaces) and can ultimately lead to insufficient oil being present in the microwave popcorn package for the popping process.

Alternative oil blends for use in microwave popcorn products are described herein. In an aspect, a fat system is utilized to provide sufficient solid fat content (SFC) to prevent wicking while enabling commercial production of the microwave popcorn products by including oil slurries having beneficial viscosity and salt suspension characteristics. In an aspect, oil slurries are utilized that include a liquid-based oil and a structuring ingredient. The structuring ingredient can be melted and blended together with the liquid-based oil and seasoning to form organogels that can be transferred through commercial processing systems while providing stability (e.g., prevent wicking and leaking of oil)

in the microwave popcorn packaging until the food product is heated and popped. The liquid oil slurries can operate at lower temperatures during commercial production as compared to palm oil-based oil slurries, where the melting point of the structuring ingredient is lower than the average running temperature of the oil slurry. During commercial processing, some of the structuring ingredient is crystallized, which permits the liquid oil to penetrate the salt strata to a degree that palm oil cannot accomplish. As a result, complete resuspension of salt into the oil slurry requires significantly less force than a palm oil-based slurry.

In one aspect, the disclosure includes a microwave popcorn product having a charge of popcorn, a liquid-based oil, a structuring ingredient, a seasoning (e.g., salt), and an antioxidant for preservation of fats, oils, fat soluble vitamins, flavors, aromas, carotenoids and other oxygen-sensitive materials, without any additional ingredients. For example, the microwave popcorn product can be free of palm oil. In an aspect, the liquid-based oil includes, but is not limited to, one or more of avocado oil, olive oil, sunflower oil, canola oil, soybean oil, corn oil, grapeseed oil, cottonseed oil, safflower oil, coconut oil, partially hydrogenated oils of these oils, mixtures thereof, and so forth. In an aspect, the structuring ingredient includes one or more of a blend of mono- and diglycerides, a palm oil, or monoglycerides. In an aspect, the liquid-based oil is avocado oil and the structuring ingredient is a blend of mono- and diglycerides.

Example Implementations

In an example implementation, a microwave popcorn product includes a charge of popcorn and a slurry including a liquid-based oil, a structuring ingredient, a seasoning, and an antioxidant for introduction to a microwave popcorn package that expands during the popping process in a microwave. The liquid-based oil and the structuring ingredient provide characteristics that prevent significant wicking of oil during product storage, that provide desirable consumer mouthfeel, that provide suspension of salt during commercial production, and that facilitate processing efficiency during commercial production.

In an aspect, the microwave popcorn product includes popcorn in an amount from about 60% to about 94.5% by weight of the microwave popcorn product total ingredients to be introduced to a microwave popcorn package. For example, the microwave popcorn product can include popcorn in an amount from about 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, and 94.5% to about 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, and 94.5% by weight of the microwave popcorn product total ingredients to be introduced to a microwave popcorn package. For example, the microwave popcorn product can include popcorn in an amount from about 76.0% to about 92.3% by weight of the microwave popcorn product total ingredients. The popcorn can be any type of corn suitable for heating and popping in a microwave (e.g., such as with use of a susceptor in a microwave popcorn package) and can include, but is not limited to, tender white popcorn, yellow popcorn, and the like.

In an aspect, the microwave popcorn product includes the slurry in an amount from about 5.5% to about 40.0% by weight of the microwave popcorn product total ingredients. For example, the microwave popcorn product can include the slurry in an amount from about 5.5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, and 40% to about 5.5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, and 40% by weight of the microwave popcorn product total ingredients. For example, the microwave popcorn product can include the slurry in an amount from about 7.7% to about 24.0% by weight of the microwave popcorn product total ingredients. For example, the liquid-based oil can be included in an amount from about 54.8% to about 67.0% by weight of the slurry. In an aspect, the liquid-based oil is included in an amount from about 8% to about 11% by weight of the total ingredients added to the microwave popcorn package. The liquid-based oil can include, but is not limited to, avocado oil, olive oil, sunflower oil, canola oil, soybean oil, corn oil, grapeseed oil, cottonseed oil, safflower oil, coconut oil, partially hydrogenated oils of these oils, mixtures thereof, and so forth. In an aspect, the liquid-based oil is avocado oil. In an aspect, the liquid-based oil is free from palm oil. The slurry can be introduced to the microwave popcorn product without significant amounts of moisture present therein, where moisture can facilitate growth of bacteria or other food contaminants. For example, the liquid-based oil can be present in the slurry with a moisture content of less than about 0.10% by weight.

The microwave popcorn product includes the structuring ingredient in the slurry to provide physical structure to the slurry that aids in preventing wicking of the liquid-based oil from the microwave popcorn packaging. The structuring ingredient can include, but is not limited to, a blend of mono- and diglycerides, palm oil, monoglycerides, or combinations thereof. In an aspect, the microwave popcorn product includes the structuring ingredient in an amount from about 6% to about 39% by weight of the slurry, where the amount can depend on the composition of the structuring agent. For example, the microwave popcorn product can include the structuring ingredient in an amount from about 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, and 39% to about 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, and 39% by weight of the slurry. The structuring ingredient can be present in the slurry in higher amounts for structuring ingredient compositions having lower melting points as compared to structuring ingredient compositions.

In an aspect, the microwave popcorn product can include a structuring ingredient formed from a blend of mono- and diglycerides in an amount from about 18%, 19%, 20%, 21%, 22%, 23%, 24%, 25%, and 26% to about 18%, 19%, 20%, 21%, 22%, 23%, 24%, 25%, and 26% by weight of the slurry, where the structuring ingredient has a melting point in a range from about 140° F. to about 146° F. For example, the microwave popcorn product can include a structuring ingredient formed from a blend of mono- and diglycerides in an amount from about 18% to about 26% by weight of the slurry, where the structuring ingredient has a melting point in a range from about 140° F. to about 146° F. In an aspect, the microwave popcorn product includes the structuring ingredient formed from a blend of mono- and diglycerides in an amount from about 18.4% to about 22.4% by weight of the slurry, where the structuring ingredient has a melting point in a range from about 140° F. to about 146° F. In an aspect, the structuring ingredient is included in an amount from about 2.5% to about 3.5% by weight of the total ingredients added to the microwave popcorn package. The structuring ingredient can include a blend of mono- and diglycerides derived from a fully hydrogenated palm stearin. In an aspect, the blend of mono- and diglycerides includes from about 60% to about 70% by weight diglycerides and from about 1% to about 10% by weight monoglycerides. For example, the blend of mono- and diglycerides can include about 63% to about 69% by weight diglycerides and from about 3% to about 8% by weight monoglycerides. Additional ingredients in the blend of mono- and diglycerides can include, but are not limited to, free fatty acid, free glycerin, and iodine.

In an example composition of the structuring ingredient, the microwave popcorn product includes a structuring ingredient formed from a blend of monoglycerides in an amount from about 6%, 7%, 8%, 9%, and 10% to about 6%, 7%, 8%, 9%, and 10% by weight of the slurry, where the structuring ingredient has a melting point of about 156° F. For example, the microwave popcorn product can include a structuring ingredient formed from a blend of monoglycerides in an amount from about 6% to about 10% by weight of the slurry, where the structuring ingredient has a melting point of about 156° F. As another example composition of the structuring ingredient, the microwave popcorn product can include a structuring ingredient formed from a blend of palm oils having a high melt fraction in an amount from about 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, and 39% to about 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, and 39% to about 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, and 39% to about 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, and 39% by weight of the slurry, where the structuring ingredient has a melting point of about 140° F. For example, the microwave popcorn product can include a structuring ingredient formed from a blend of palm oils having a high melt fraction from about 6% to about 10% by weight of the slurry, where the structuring ingredient has a melting point of about 156° F.

In an aspect, the fat system included in the slurry can include a ratio of liquid-based oil to structuring ingredient from about 2.4, 2.5, 2.6, 2.7, 2.8, 2.9, 3.0, 3.1, 3.2, 3.3, 3.4, 3.5, and 3.6 to about 2.4, 2.5, 2.6, 2.7, 2.8, 2.9, 3.0, 3.1, 3.2, 3.3, 3.4, 3.5, and 3.6 by weight. For example, the fat system included in the slurry can include a ratio of liquid-based oil to structuring ingredient from about 2.4 to about 3.6 by weight.

The microwave popcorn product can include seasoning to provide or enhance various flavors of the popcorn. For example, the microwave popcorn product can include seasoning in an amount from about 15%, 16%, 17%, 18%, 19%, 20%, 21%, and 22% to about 15%, 16%, 17%, 18%, 19%, 20%, 21%, and 22% by weight of the slurry. In an aspect, the microwave popcorn product can include seasoning in an amount from about 15% to about 22% by weight of the slurry. In an aspect, the seasoning is included in an amount from about 2.5% to about 3.5% by weight of the total ingredients added to the microwave popcorn package. For example, the microwave popcorn product can include the salt in an amount from about 16.6% to about 20.2% by weight of the slurry or from about 2.7% to about 3.0% by weight of the total ingredients added to the microwave popcorn package. The salt can include various types (e.g., sea salt, kosher salt, rock salt, and the like) and sizes (e.g., finely ground salt, flour-cut salt, pulverized salt, and the like) of salts. In one aspect, the salt includes purified sea salt powder having at least about 50% to at least about 85% by weight of the salt having a size of less than 44 microns to facilitate suspension of the salt in the slurry. During some instances in commercial processing of the slurry (e.g., prior to introduction of the slurry to the popcorn charge in the microwave popcorn packaging), some of the structuring ingredient can become crystallized, which permits the liquid-based oil to penetrate the salt strata to a degree that palm oil cannot accomplish. For example, if the slurry becomes stagnant within the commercial process of producing the microwave popcorn product (e.g., during maintenance, during an outage of power, or the like), portions of the salt or other seasoning components may begin to settle. However, the crystallization of the structuring agents can maintain suspension of salts or can resuspend salt into the oil slurry through significantly less force than a palm oil-based slurry, such as through pump action, impellor or other mixer activity, or the like.

The microwave popcorn product can include the antioxidant in an amount from about 0.29% to about 0.35% by weight of the slurry. In an aspect, the antioxidant is included in an amount from about 0.02% to about 0.08% by weight of the total ingredients added to the microwave popcorn package. The antioxidant can include, but is not limited to, a mixture of tocopherols to provide a food-grade, plant-derived antioxidant for preservation of fats, oils, fat soluble vitamins, flavors, aromas, carotenoids and other oxygen-sensitive materials.

In an aspect, the slurry used in the microwave popcorn product prevents wicking and leaking of the liquid-based oil through selection of the ingredients utilized and, as a result, traditional microwave popcorn packaging can be utilized without significant wicking and leaking of the liquid-based oil. For example, the structuring ingredient is melted and blended into the slurry to create organogels that provide flow characteristics suitable for commercial processing while providing stability in the bag until heated and popped. Organogels offer unique physical properties that allow the liquid-based oil to be the predominant fat, while providing structural integrity throughout the shelf life of the microwave popcorn product.

Example Production Process

Referring to FIG. 1, an example production process 100 for production of the microwave popcorn product described herein is provided. The process 100 is shown generally including a slurry tank 102, a run tank 104, a slurry fill line 106, and a fill station 108. The slurry tank 102 receives the ingredients of the slurry for and provides conditions to melt certain components of the slurry and blend the ingredients to provide a liquid slurry. For example, the slurry tank 102 can receive the liquid-based oil, the structuring ingredient, the seasoning, and any additives for blending via a mixing device (e.g., paddle blender, impellor, etc.).

The temperature of the slurry tank 102 is controlled to provide temperature conditions that can liquify the structuring ingredient and blend the ingredients of the slurry together to provide a substantially homogenous slurry for transport to the run tank 104. For example, the structuring ingredient can be provided to the slurry tank 102 in a solid state (e.g., having a melting point above ambient conditions of the process 100), where the temperature of slurry tank 102 is controlled by a heater 110 to operate the slurry tank 102 at or between a minimum operating temperature and a maximum operating temperature. The minimum operating temperature can be a temperature above the melting point of the structuring ingredient, such that the slurry tank 102 operates to obtain a complete melt of the structuring ingredient and the liquid-based oil to erase any crystal memory of the components of the slurry to provide for formation of an organogel that will maintain the liquid-based oil within the organogel during ambient storage conditions of the microwave popcorn product. If the operating temperature does not meet or exceed the minimum temperature, the slurry may maintain an original crystal memory, causing at least a partial failure of the organogel formation, which can result in undesired wicking of oil within the microwave popcorn packaging. The maximum operating temperature can be a temperature that avoids oxidation or other breakdowns of the integrity of the components of the slurry, such as the liquid-based oil or the structuring agent. In implementations, the heater 110 maintains the temperature of the slurry tank 102 at a temperature from about 148° F. to about 160° F. to melt the structuring ingredient for blending with the liquid-based oil, the seasoning (e.g., salt), and any additives (e.g., antioxidants). For example, the heater 110 can maintain the temperature of the slurry tank 102 at a temperature from about 150° F. to about 158° F.

The process 100 controls the duration of the slurry preparation in the slurry tank 102 to provide a complete melting and blending of the structuring ingredient with the remaining slurry ingredients. The duration of slurry preparation is generally dependent on a number of factors, such as the capacity of the slurry tank 102, the heat transfer rate of the heater 110, the total amount of ingredients added to the slurry tank 102, the ambient temperature of the process 100, and the like. In implementations, the duration of slurry preparation is from about 3 to about 5 hours to provide sufficient increase of heating of the slurry tank 102 by the heater 110 without introducing too much heat to exceed the maximum operating temperature.

When the process 100 achieves a blended slurry within the slurry tank 102, such that the structuring ingredient is melted and blended with the other slurry ingredients (e.g., a substantially homogenous slurry with liquid structuring agent), the slurry can be transferred from the slurry tank 102 to the run tank 104 to prepare the slurry for introduction into microwave popcorn bags. In implementations, the run tank 104 is temperature controlled via a heater 112, which can include heater 110, can be a separate heating device, or can be combinations thereof. For example, the heater 112 can control the temperature of the run tank 104 to operate within the same temperature conditions as the slurry tank 102 to maintain the structuring ingredient in the liquid state, blended together with the remaining components of the slurry. The run tank 104 can include a mixing device to maintain a substantially homogenous mixture for the slurry. In implementations, the run tank 104 includes a recirculation pump (e.g., pump 114 shown) to provide or assist in the mixing of the slurry held in the run tank 104, which provides substantially complete suspension of the seasoning and any additives within the slurry.

In one aspect, the slurry tank 102 is operated as a batch process to provide melting of the structuring ingredient and subsequent transfer of the blended slurry to the run tank 104, to provide an emptied slurry tank 102. The emptied slurry tank 102 can then receive new ingredients to provide a subsequent slurry batch while the prior slurry batch held by the run tank 104 is transferred into microwave popcorn bags. Such dual tank system can increase throughput of the process 100 by utilizing the time spent filling the microwave popcorn bags with slurry held in the run tank to prepare additional slurries in the slurry tank 102 for later transport to the run tank 104. However, it will be appreciated that the process 100 is not limited to a dual tank system and can include multiple slurry tanks, multiple run tanks, and combinations thereof to accommodate multiple slurry preparation pathways and multiple slurry fill pathways.

The run tank 104 is fluidically coupled with one or more slurry fill lines 106 that transport the slurry to the fill station 108 which receives microwave popcorn bags and introduces a charge of popcorn and a volume of slurry into each bag. The microwave popcorn bags have an interior volume configured to expand during a microwave heating process, for example by including flexible panels, gussets, or the like. In implementations, the charge of popcorn is introduced to the microwave popcorn bag prior to introduction of the slurry to popcorn, which can aid in cooling of the slurry to form the organogel suitable to contain the liquid-based oil within the structure of the organogel to prevent wicking of the liquid-based oil. Following the filling, the microwave popcorn bag can be sealed and package for distribution.

Example Experimentation

Wicking studies performed at 114° F. confirmed the ability of the microwave popcorn product having the liquid-based oil and structuring ingredient slurries described herein to prevent wicking and leaking of the liquid oil. Qualitative studies at room temperature (e.g., 73° F.) at minimum commercial production temperature (e.g., 125° F.) demonstrated that the fat system performed appropriately at a ratio of liquid-based oil to structuring ingredient from about 3.11 to about 3.35.

Figure 2:
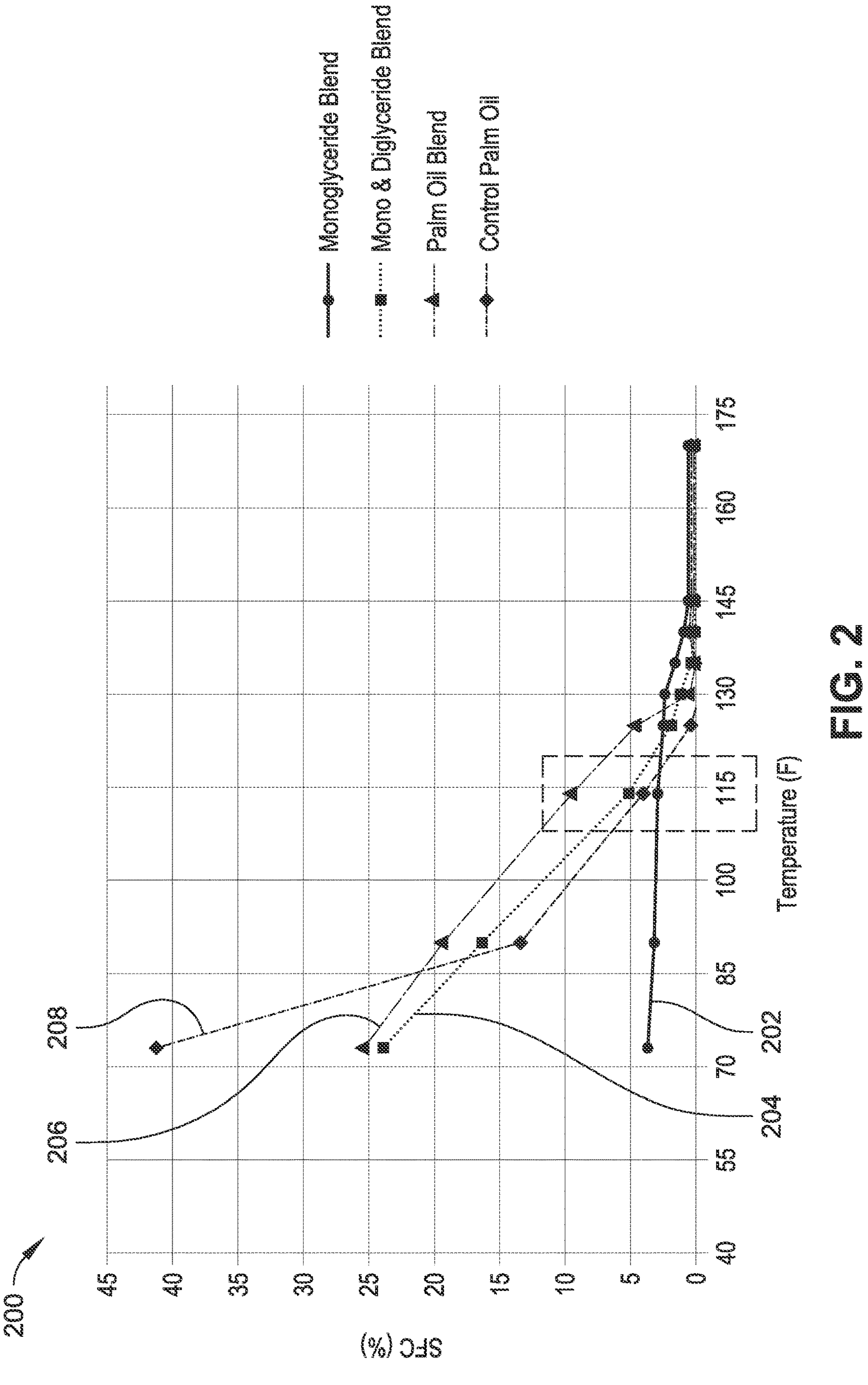
FIG. 2 is a chart of solid fat content (SFC) over a range of temperatures for multiple fat content compositions in accordance with example implementations of the present disclosure.

Solid fat content (SFC) was analyzed over a range of operating temperatures for a variety of fat content compositions. Results for four of the compositions are shown with respect to the chart 200 shown in FIG. 2, where a series of data for a fat content composition including a monoglyceride blend and additional liquid-based oil is referenced as 202, a series of data for a fat content composition including a mono- and diglyceride blend and additional liquid-based oil is referenced as 204, a series of data for a fat content composition including a high melt palm oil blend and additional liquid-based oil is referenced as 206, and a series of data for a control fat content composition including a palm oil with no additional liquid-based oil is referenced as 208. Each of the compositions included an equal amount of salt and antioxidant by weight percentage. Each of the compositions labeled 202, 204, and 206 included the same liquid-based oil present in different weight percentages due to the differing structuring ingredients utilized (e.g., monoglyceride blend, mono- and diglyceride blend, high melt palm oil blend, respectively). The weight percentages of the combined liquid-based oil and the structuring ingredient for each of the compositions labeled 202, 204, and 206 and the weight percentage of the palm oil for the composition labeled 208 was the same.

The fat content composition including the mono- and diglyceride blend and the fat content composition including the palm oil blend provided higher SFC values at 114° F. than the control fat content composition, even though the two fat content compositions provided a lower SFC at room temperature than the control fat content composition. Additionally, the fat content composition including the monoand diglyceride blend and the fat content composition including the palm oil blend provided similar SFC values as the control fat content composition including palm oil at commercial plant operation temperatures (e.g., temperatures from about 125° F. and higher), while maintaining suitable SFC to prevent wicking of the fat content compositions through microwave popcorn packaging at room temperature conditions.

Conclusion

It is to be understood that any embodiment or implementation of the disclosure manifested above as a system or method may include at least a portion of any other embodiment or implementation described herein. Those having skill in the art will appreciate that there are various embodiments or implementations by which systems and methods described herein can be implemented, and that the implementation will vary with the context in which an embodiment of the disclosure is deployed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A microwave popcorn product comprising:

a microwave popcorn package having an interior volume configured to expand during a microwave heating process of the microwave popcorn product;

a charge of popcorn contained within the interior volume of the microwave popcorn package; and a slurry including a mixture of each of a liquid-based oil;

a fat-based structuring ingredient; and a seasoning, wherein the fat-based structuring ingredient includes a blend of mono- and diglycerides in an amount from about 18% to about 26% by weight of the slurry, and wherein the slurry includes the liquid-based oil in an amount from about 54.8% to about 67.0% by weight of the slurry and includes no palm oil, and wherein the slurry is in the form of an organogel of the fat-based structuring ingredient and the liquid-based oil to maintain the liquid-based oil within the organogel at room temperature storage conditions of the microwave popcorn product.

2. The microwave popcorn product of claim 1, further comprising an antioxidant.

3. The microwave popcorn product of claim 1, wherein the liquid-based oil includes at least one of avocado oil, olive oil, sunflower oil, canola oil, soybean oil, corn oil, grapeseed oil, cottonseed oil, safflower oil, or coconut oil.

4. The microwave popcorn product of claim 1, wherein the fat-based structuring ingredient includes a blend of mono- and diglycerides in an amount from about 18.4% to about 22.4% by weight of the slurry.

5. The microwave popcorn product of claim 1, wherein the blend of mono- and diglycerides includes from about 60% to about 70% diglycerides by weight of the blend and from about 1% to about 10% monoglycerides by weight of the blend.

6. The microwave popcorn product of claim 1, wherein the liquid-based oil includes avocado oil.

7. The microwave popcorn product of claim 1, wherein the seasoning includes salt in an amount from about 15% to about 22% by weight of the slurry, and wherein at least 50% percent by weight of the salt has a size of less than 44 microns.

8. A microwave popcorn product comprising:

a microwave popcorn package having an interior volume configured to expand during a microwave heating process of the microwave popcorn product;

a charge of popcorn contained within the interior volume of the microwave popcorn package; and a slurry including a mixture of each of a liquid-based oil in an amount from about 54.8% to about 67.0% by weight of the slurry, the liquid-based oil including at least one of avocado oil, olive oil, and sunflower oil;

a fat-based structuring ingredient, wherein the fat-based structuring ingredient includes a blend of mono- and diglycerides in an amount from about 18% to about 26% by weight of the slurry; and a seasoning, wherein the slurry includes no palm oil and is in the form of an organogel of the fat-based structuring ingredient and the liquid-based oil to maintain the liquid-based oil within the organogel at room temperature storage conditions of the microwave popcorn product.

9. The microwave popcorn product of claim 8, wherein the seasoning includes salt in an amount from about 15% to about 22% by weight of the slurry.

10. The microwave popcorn product of claim 9, wherein at least 50% percent by weight of the salt has a size of less than 44 microns.

11. The microwave popcorn product of claim 9, wherein the charge of popcorn is included in an amount from about 76.0% to about 92.3% by weight of the microwave popcorn product total ingredients.

* * * * *